United States Patent [19]
Stone

[11] Patent Number: 5,668,683
[45] Date of Patent: Sep. 16, 1997

[54] COUNTER BALANCED ROTARY AIRLOCK ACTUATOR LATCH ASSEMBLY FOR DISK DRIVE

[75] Inventor: Thomas R. Stone, San Francisco, Calif.

[73] Assignee: Quantum Corporation, Milpitas, Calif.

[21] Appl. No.: 646,410

[22] Filed: May 7, 1996

[51] Int. Cl.$^6$ .................................................. G11B 5/54
[52] U.S. Cl. ................................................ 360/105
[58] Field of Search ..................... 360/105, 106, 360/109, 97.01

[56] References Cited

U.S. PATENT DOCUMENTS

| | | | |
|---|---|---|---|
| 4,562,500 | 12/1985 | Bygdnes | 360/105 |
| 4,647,997 | 3/1987 | Westwood | 360/105 |
| 4,692,829 | 9/1987 | Campbell | 360/105 |
| 5,036,416 | 7/1991 | Mastache | 360/105 |
| 5,124,867 | 6/1992 | Kitahori et al. | 360/105 |
| 5,274,519 | 12/1993 | Saito et al. | 360/105 |
| 5,303,101 | 4/1994 | Hatch et al. | 360/105 |
| 5,319,511 | 6/1994 | Lin | 360/105 |
| 5,363,261 | 11/1994 | Eckberg et al. | 360/105 |
| 5,404,257 | 4/1995 | Alt | 360/105 |
| 5,528,437 | 6/1996 | Mastache | 360/105 |
| 5,543,986 | 8/1996 | Albrecht | 360/105 |
| 5,555,146 | 9/1996 | Hickox et al. | 360/105 |

*Primary Examiner*—Stuart S. Levy
*Assistant Examiner*—David L. Ometz
*Attorney, Agent, or Firm*—John C. Chen

[57] ABSTRACT

An airlock latch assembly for restraining a disk drive actuator when the disk is not spinning and the disk drive is subjected to a rotational shock force includes a latch member meshably engaged with a counter inertia member by gear teeth provided on each member. The latch member and the counter inertia member are each characterized by a moment of inertia, the ratio of which is determined by the gear ratio of the respective gear teeth. The latch assembly also restrains the actuator in its proper position when the disk drive is subject to linear shock forces.

15 Claims, 7 Drawing Sheets

FIG.—1
(PRIOR ART)

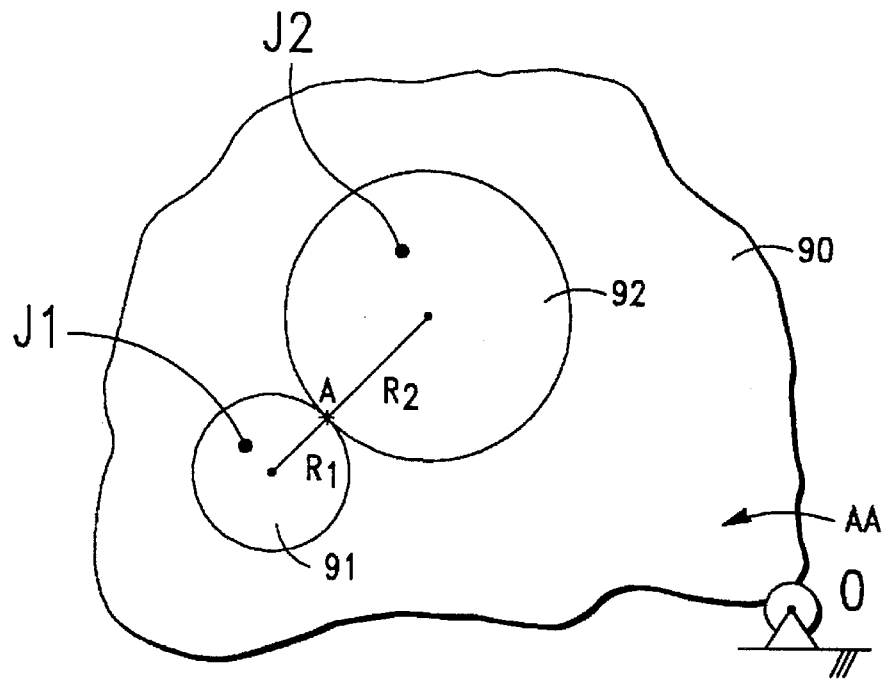
*FIG.-5A*
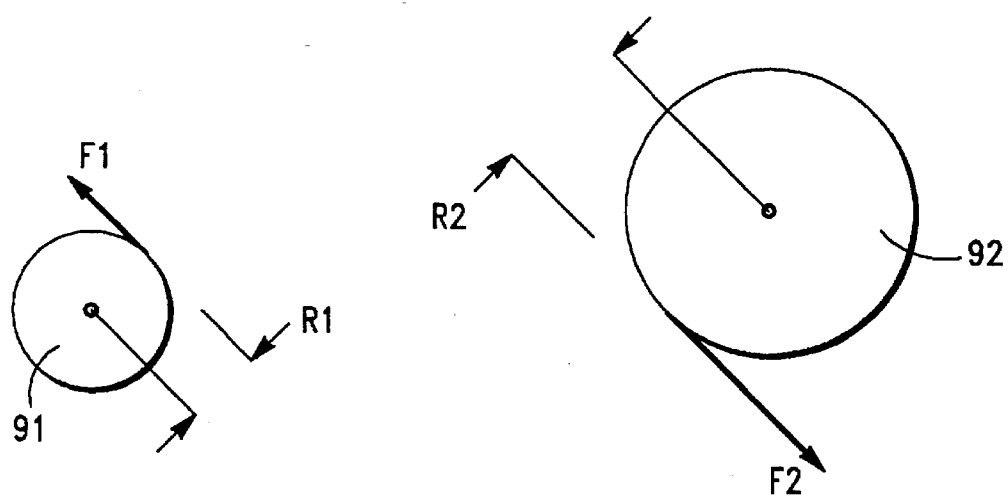
*FIG.-5B*  *FIG.-5C*

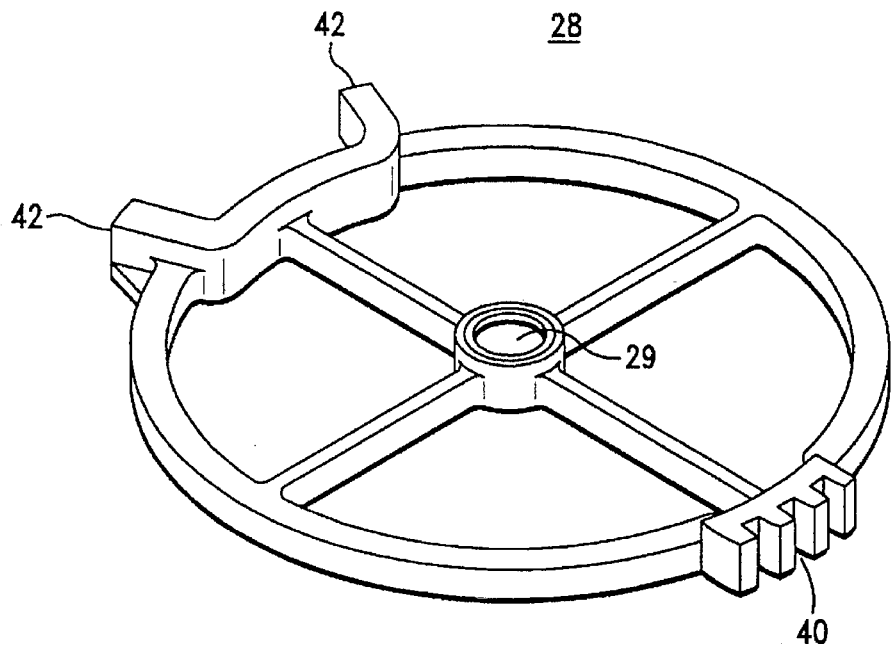
*FIG.—7A*
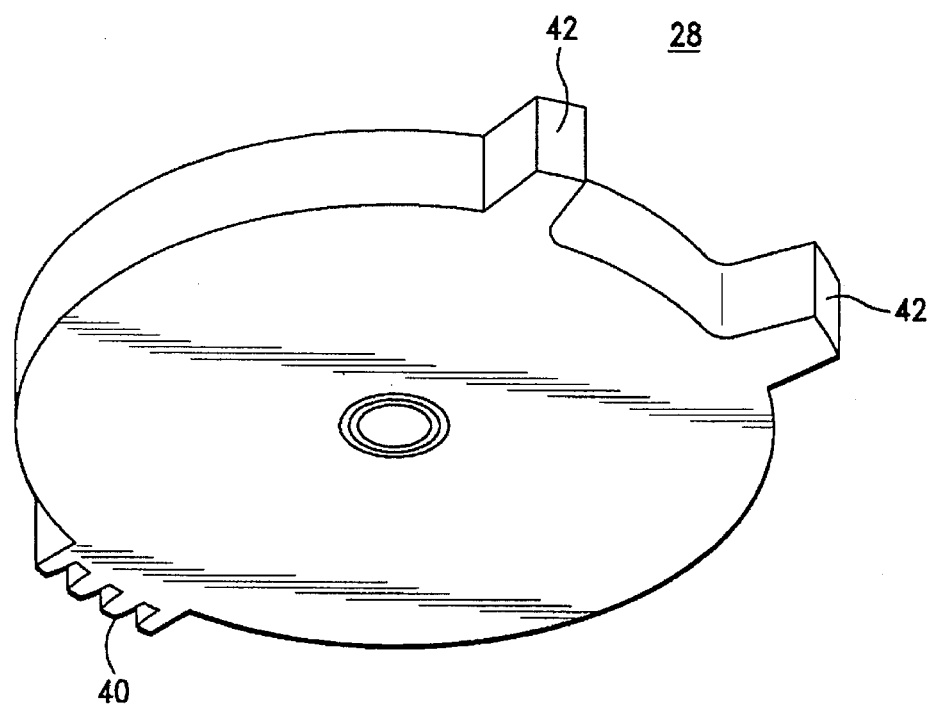
*FIG.—7B*

5,668,683

COUNTER BALANCED ROTARY AIRLOCK ACTUATOR LATCH ASSEMBLY FOR DISK DRIVE

FIELD OF THE INVENTION

The present invention relates to actuator latches within hard disk drives. More particularly, the present invention relates to a rotary airlock actuator latch having a counter rotational inertia member which enables an actuator assembly to remain restrained by the actuator latch when the disk drive is subjected to a rotary shock force.

BACKGROUND OF THE INVENTION

In conventional Winchester disk drives, a read/write head or transducer assembly "flies" upon an air bearing or cushion in very close proximity to the rotating surface of the data storage disk. The disk surface carries a thin film magnetic material having a multiplicity of magnetic storage domains that may be recorded and read back by the head. The transducer assembly, which can be any conventional combination of transducers, sliders and load beams, is positioned and supported proximate the surface of the data storage disk using an actuator. The combination of the transducer assembly and the actuator is known as the transducer actuator or actuator assembly. The actuator supports the load beams and sliders and accurately positions the transducers above the surface of the disk within a "data area" to read and write data from/to the disk. When not in operation, the actuator assembly remains stationary in a "landing zone" along the inner diameter of the disk wherein the transducer rests on the surface of the disk. An actuator latch prevents the actuator assembly from moving into the data area during non-operation. The latch may include an air vane portion which extends over the surface of the disk and pivots about an axis of rotation. As airflow generated by the rotating disk overcomes a biasing force from e.g. a magnet, the latch moves to release the actuator assembly. Such actuator latches are known as "airlocks".

Hard disk drives (HDD's) have typically used textured media having a moderate coefficient of friction of less than 1.0 between the read/write heads and the disks. If the actuator latch on such an HDD were to fail, resulting in the head being in contact with the data area of a stationary disk, this moderate coefficient of friction was low enough that the spindle motor typically could start. Thus, although the latch failure could result in media damage and possibly some data loss, it would not typically result in a catastrophic drive failure such as the inability to spin up.

In the quest for higher and higher areal densities, the industry is increasingly adopting "zone-textured" media. With this media, only the landing zone is textured, and has a coefficient of friction typically less than 1.0. The data area is smoothly polished, and the coefficient of friction therein may be 10 or more times higher than that in the landing zone. Failure of the actuator latch in a drive employing such media would likely result in catastrophic drive failure. Thus the advent of zone-textured media has made the reliability of actuator latches much more important than it has been in the past.

FIG. 1 shows a plan view of a somewhat simplified disk drive 10 incorporating an airlock actuator latch 11. The airlock actuator latch 11 includes an air vane portion 12, depicted in a latched position, wherein the transducer 4 rests on a disk 13 at a landing zone 2. As shown in FIG. 1, in order for a transducer 4 to enter a data area 3 of the disk 13, airlock actuator latch 11 must rotate clockwise, to disengage from an actuator assembly 17, followed by a clockwise rotation of the actuator assembly 17.

The latch 11 is specifically designed to be mass balanced about its axis of rotation so that linear shocks will not cause it to rotate and possibly permit the actuator assembly 17 to escape from its latched position. In practice, conventional rotary airlock actuator latches have proven to be reasonably reliable in keeping the actuator assembly 17 latched, provided that the input shock is linear in nature.

However, conventional air vane actuator latching mechanisms such as that of FIG. 1 offer less protection against rotary shock forces. When subjected to rotary shock, which may be described as sudden and rapid rotational movement of the disk drive 10, the respective inertias of the air vane latch 11 and the actuator assembly 17 cause them to tend to maintain their relative angular orientation, rather than to rotate with disk drive base 18. Thus, if the base 18 is suddenly rotated counterclockwise, the air vane latch 11 and the actuator 17, will tend not to rotate with the base 18. In effect, the latch 11 and actuator 17 undergo a clockwise rotation with respect to the base 18, resulting in the orientation shown in FIG. 2 and an unwanted release of the actuator assembly 17. When the disk 13 is not rotating, release of actuator 17 causes unwanted contact between the slider and the data storage area 3. (FIG. 2 shows this problem) In practice, it is fairly easy to cause the prior air vane latch to fail in response to certain rotary shock forces, more frequently present especially in portable and laptop computers.

Thus, there exits a hitherto unsolved need for an improved, simple and cost efficient latching apparatus which can effectively protect against rotary as well as linear shock forces.

SUMMARY OF THE INVENTION WITH OBJECTS

A general object of the present invention is to provide an improved disk drive airlock actuator latch assembly which overcomes limitations and drawbacks of the prior art by resisting rotary shock forces as well as linear shock forces.

More specifically, it is an object of the present invention to provide a counter balanced airlock actuator latch assembly which, in a latched position, resists rotation when the disk drive is subjected to sudden rotation.

Another object of the present invention is to provide a counter balanced airlock actuator latch assembly which resists rotation when the disk drive is subjected to sudden linear acceleration.

In accordance with principles of the present invention, an airlock actuator latch assembly includes a latch member and a counter inertia member. The latch member functions much like conventional airlock actuator latches, wherein the force of airflow generated by rotating disks impinging against the air vane rotates the latch member into an unlatched position, permitting the actuator assembly to move into the data zone. The latch member and the counter inertia member are rotatably mounted to the disk drive base and coupled together such that when one member tends to rotate in one direction, the other member tends to counter rotate in an opposite direction. In a preferred embodiment, spur gear segments are used for cross-coupling the members. The two members are each characterized by moments of inertia about their respective axes of rotation such that the ratio of inertia between the counterinertia member and the latch member is the inverse of the gear ratio defined by the gear teeth therein between. In addition, the latch member and the counter inertia member are each mass balanced about their respective axes of rotation, such that the latch assembly remains latched against the actuator assembly when the disk drive is subjected to a linear shock force.

BRIEF DESCRIPTION OF THE DRAWINGS

In the Drawings:

FIGS. 5A–5C are mathematical models of the counter inertia actuator latch of the present invention and help to explain how the counter inertia actuator latch resists rotation when the disk drive is subjected to a sudden rotation.

FIG. 7A is a top perspective view of the counter inertia member shown in FIG. 3.

FIG. 7B is a bottom perspective view of the counter inertia member shown in FIG. 3.

DETAILED DESCRIPTION OF PREFERRED EMBODIMENTS

Figure 1:
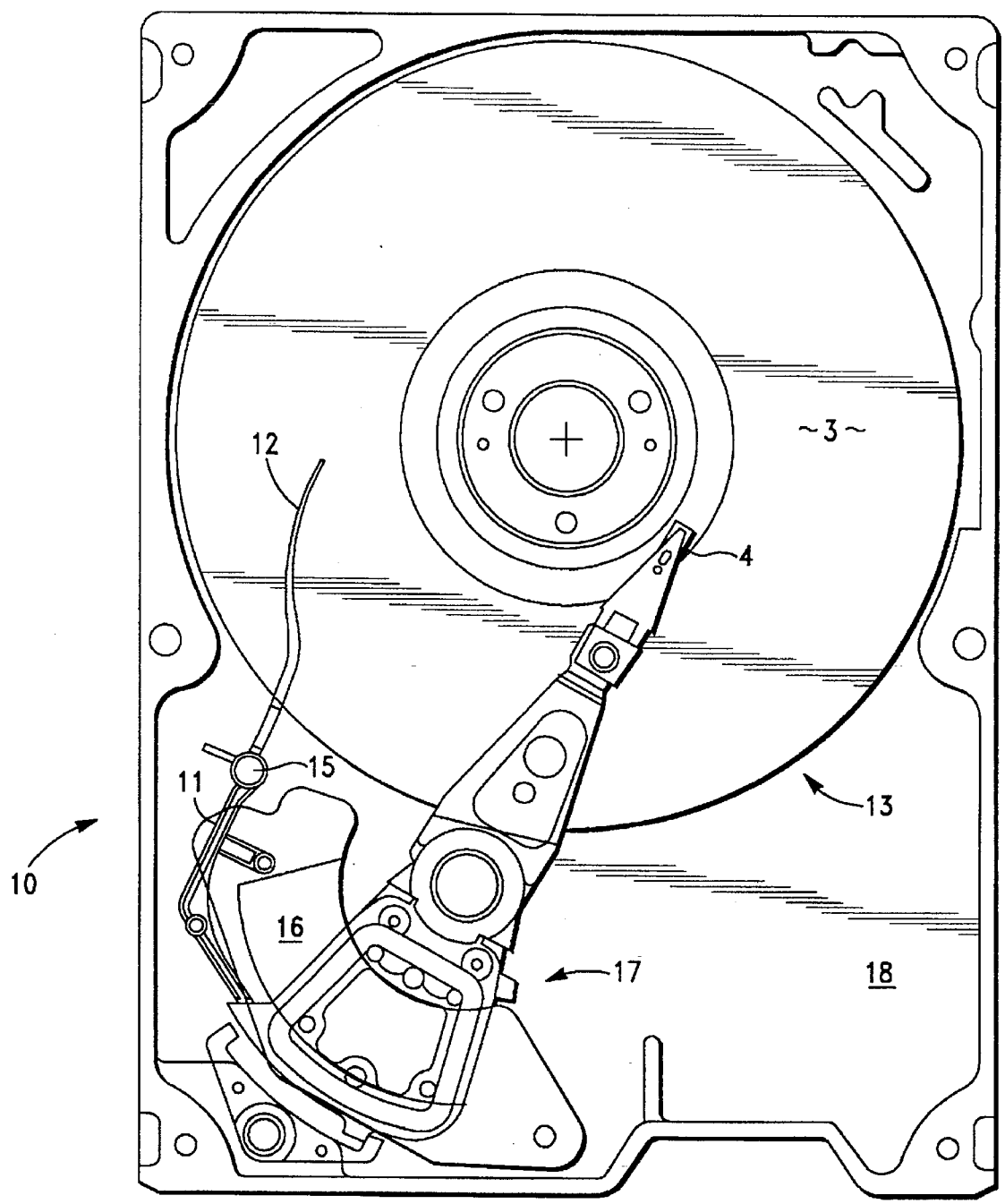
FIG. 1 is a top plan diagrammatic view of a head and disk assembly for a hard drive, including a prior art airlock actuator latching mechanism, shown in its latched position.
Figure 2:
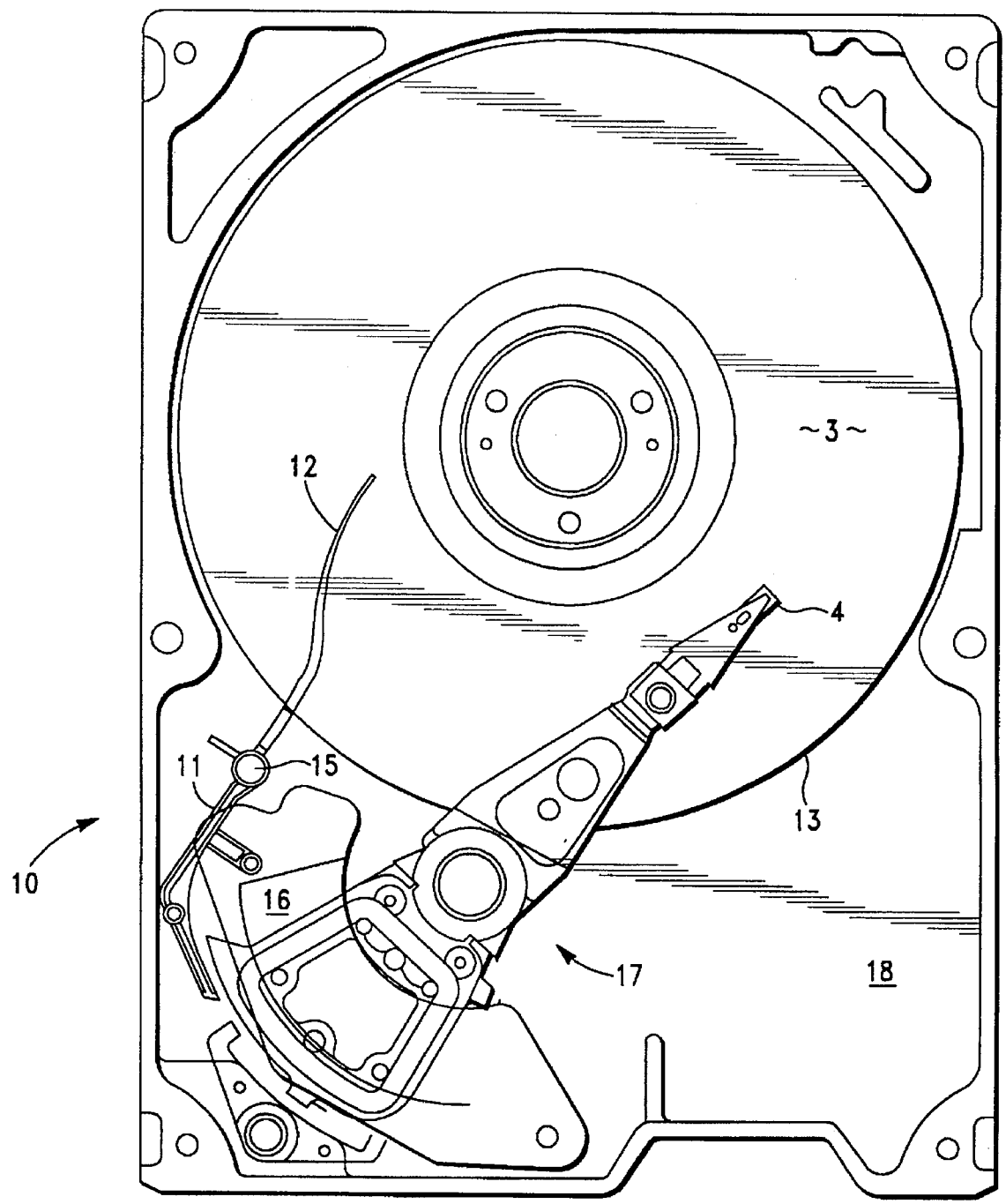
FIG. 2 is a top plan diagrammatic view of the disk drive of FIG. 1, showing an actuator release orientation of the prior airlock actuator latching mechanism after the disk drive is subjected to a rotational shock force.
Figure 3:
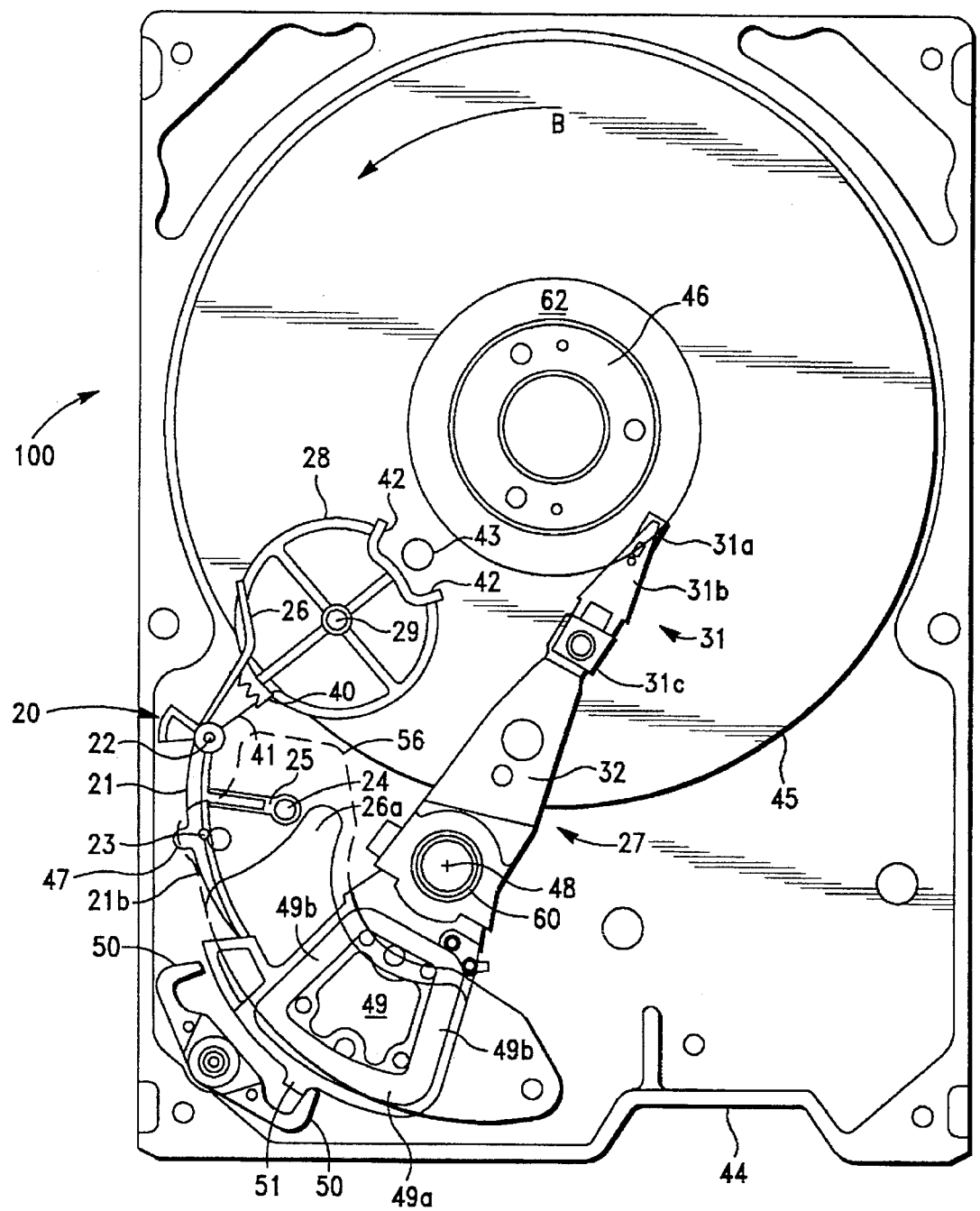
FIG. 3 is an top plan diagrammatic view of a head and disk assembly of a hard disk drive, in accordance with principles of the present invention, including an airlock actuator latch assembly, shown in its latched position.

FIG. 3 shows a plan view of a somewhat simplified disk drive 100 in accordance with principles of the present invention. The disk drive 100 includes a base 44, spindle or hub 46 having an axis of rotation, a data storage disk 45 rotatably mounted to the spindle 46, a rotary transducer actuator assembly 27, and an airlock actuator latch assembly 20. For simplicity, the following discussion describes operation of a disk drive 100 having a single data storage disk 45. However, as those skilled in the art will recognize, the present invention is capable of being used in a disk drive employing a plurality of data storage disks stacked upon a common spindle. Typically, a brushless spindle motor (not shown) is coupled to, or included within, the spindle 46 for rotating the data storage disk 45 at a predetermined angular velocity. The spindle motor is preferably integrated into the hub 46 that supports the data storage disk 45, such that the spindle motor supports and directly rotates the data storage disk 45. The data storage disk 45 is rotated in a counter-clockwise direction, as indicated by arrow B, about its axis of rotation.

The data storage disk 45 can have a single surface, or both an upper and lower surface, on which data is stored. Typically, the surface of the disk 45 is made very smooth and is coated, plated or deposited with a suitable magnetic material, such as cobalt alloy. However, the storage disk can be optical, magneto-optical, or the like.

The transducer actuator assembly 27 is bi-directionally rotatably journalled to the base 44 about an axis of rotation 48. The transducer actuator assembly 27 can rotate bi-directionally along a path of e.g. approximately 30 degrees, as indicated by arrow R in FIG. 4. The transducer actuator assembly 27 includes a transducer assembly 31, comprising a slider-transducer 31a, a load beam 31b, and a swage plate 31c. The transducer assembly 31 is typically swageably mounted to a structural member 32 commonly known as a C-block or E-block. Attached to member 32 is an actuator voice coil motor 49. The transducer actuator assembly can be either a rotary or linear-type assembly, although a rotary assembly is presently preferred.

Actuator voice coil motor 49 comprises a flat trapezoidal shaped coil 49a of insulated small gauge copper wire. The side legs 49b of the coil 49a are positioned within high intensity magnetic fields. The magnetic fields are generated by e.g. plural high flux intensity permanent magnets 26a and 26b (shown more clearly in FIG. 4) secured to a lower flux return plate 56 of high magnetic permeability such as low-carbon steel and an upper magnetic plate assembly (not shown) having two similar permanent magnets and an upper flux return plate.

Figure 4:
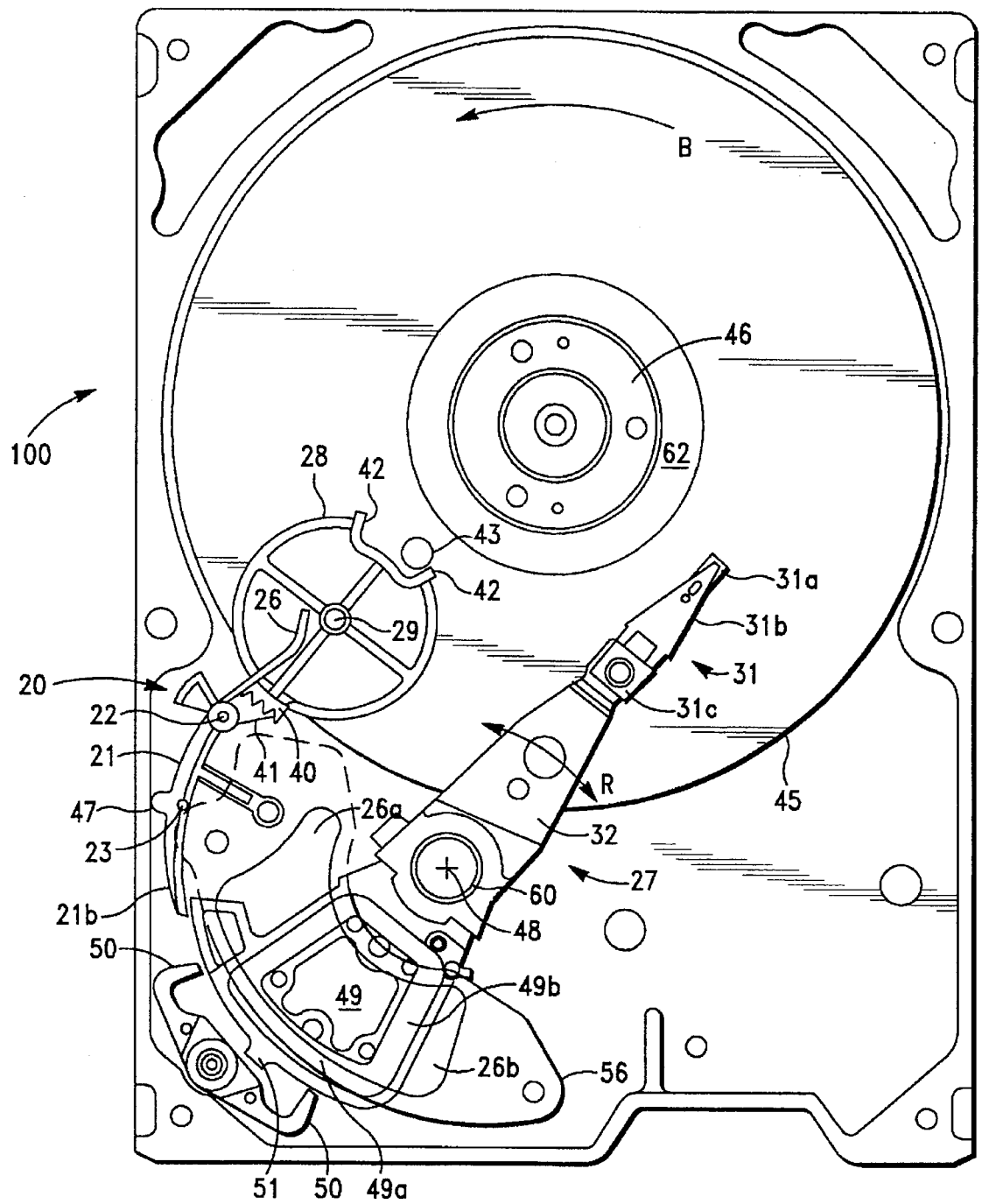
FIG. 4 is an top plan diagrammatic view of the airlock actuator latch assembly of FIG. 3, shown in an unlatched position.

A crash stop 51 is integrally formed with the voice coil motor 49, as shown in FIG. 4, which limits the rotary travel of the actuator assembly 27 by contacting outer limit stops 50a and inner limit stop 50b, preventing the actuator assembly 27 from traveling beyond the outer periphery of the disk 45 as well as "crashing" into the spindle 46.

The two magnets 26a and 26b have pole faces of opposite polarity directly facing opposite legs of the coil 49a. The resultant magnetic fields are such that current passing through the coil 49a in one direction causes rotation of the actuator assembly 27 in one radial direction relative to the disks such as the radially outward "unlatched" direction, while reverse current causes reverse direction movement such as the radially inward "latched" direction.

The transducer assembly 31 is attached at one end to C-block 32 in a conventional manner, and the voice coil motor 49 is attached to the other end of the C-block 32 by adhesive or by integral molding thereto. The transducer actuator assembly 27 is mounted to the base 44 by a journal 60 about which the transducer actuator assembly 27 rotates. The journal 60 is disposed adjacent to a peripheral edge of the data storage disk 45 such that the C-block 32 and transducer assemblies extend over the surface of the disk 45. Activation of the actuator voice coil motor 49 rotates the transducer actuator assembly about the journal 60 and accurately positions the transducer assembly 31 over concentric data tracks on the surface of the data storage disk 45, to enable read/write transducers access to stored data.

During disk drive operation, the transducer actuator assembly 27 rotates relative to the surface of the disk 45, as indicated by arrow R, to position the transducer over the desired data tracks. When the actuator voice coil motor 49 is deactivated, the transducer assembly 31 must be positioned to a parking or landing zone 62, on the disk 45, where the transducer assembly 31 will not damage the surface of the disk 45. Typically, the landing zone 62 is an inner annular region of the disk 45 approximate to the spindle 46 and is textured to facilitate contact start/stop operations of the disk drive. The airlock actuator latch assembly 20 of the present invention locks the transducer actuator assembly 27 as the transducer assembly returns to rest in the landing zone 62.

Figure 6A:
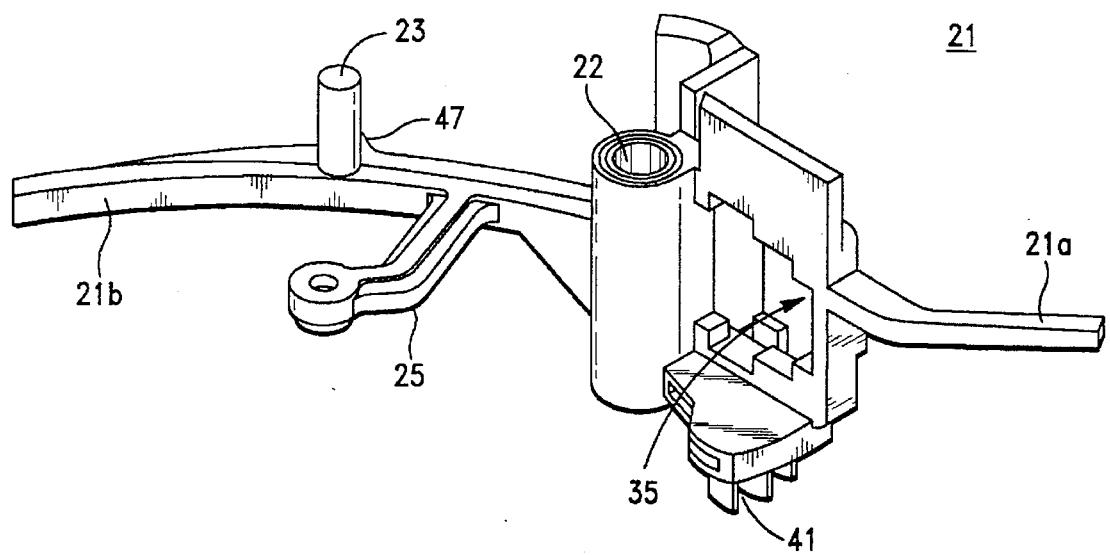
FIG. 6A is a top perspective plan view of the latch member shown in FIG. 3.
Figure 6B:
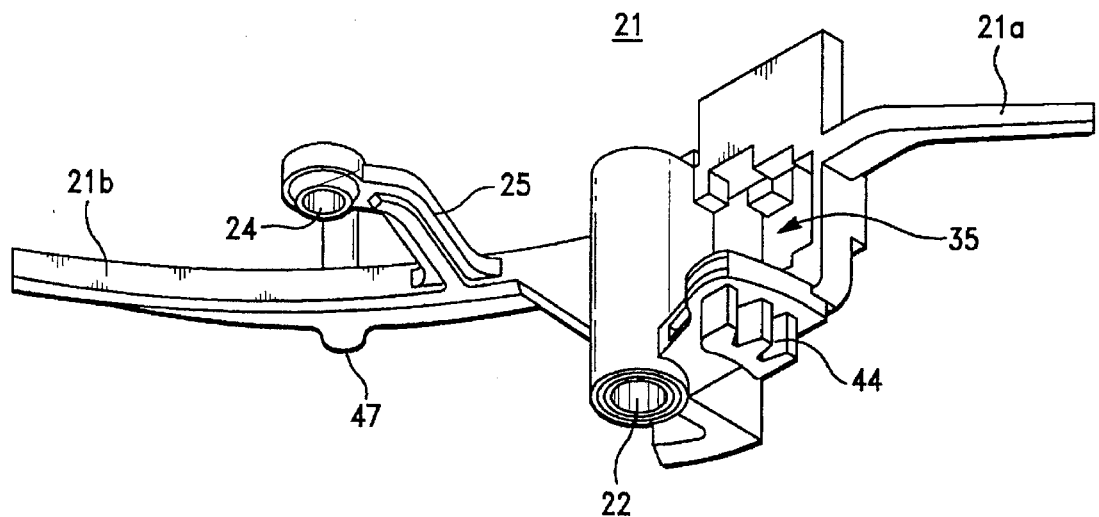
FIG. 6B is a bottom perspective plan view of the latch member shown in FIG. 3.

In one preferred embodiment, the airlock actuator latch assembly 20 is disposed beneath the disk 45 and includes a latch member 21 and a counter inertia member 28. The latch member 21, shown in detail in FIGS. 6A and 6B, further includes an integral air vane portion 21a and an integral latching portion 21b and is rotatably mounted to a shaft 22 fixed to the base 44. The latch member 21 is retained on shaft 22 by a projecting portion of the upper magnetic plate (not shown) or by other suitable means, such as a retaining washer. Like most conventional airlock latch members, the present latch member 21 is configured such that it is mass balanced about its own axis of rotation. Additionally, the air vane portion 21a extends out under the bottom surface of the disk 45 in close proximity to the disk surface.

The latch member 21 may also beneficially be configured with a cavity 35 in which an air filter (not shown) can be mounted. The air filter serves to trap any particles which may be present or may be generated inside the disk drive assembly, thereby preventing particles from contaminating the disk surface.

Travel of the latch member 21 in the counterclockwise direction is limited by the contact of a stop pin 23 with some part of the base 44, preferably on the upper magnetic plate (not shown). Clockwise travel of the latch member 21 is limited by the contact of a crash stop 47, extending from the side of the latching portion 21b, with the side wall of the base 44. The latch member 21 also includes a magnetic return spring of the type described in commonly assigned U.S. Pat. No. 5,319,511, the disclosure being incorporated herein by reference. The magnetic return spring biases the latching portion 21b against the actuator assembly 27 in the latched position when the disk 45 is not spinning. The spring includes a small steel pin or ball 24 mounted on a projecting arm 25 extending away from the latching portion 21b, exposing the steel ball 24 to the magnetic field generated by magnet 26a. The return spring is designed such that the airflow force generated by the spinning disk and impinging against the air vane portion 21a, is sufficient to overcome the magnetic field biasing the latch member 21 toward the latched position. Those skilled in the art will understand that other types of return springs may be utilized, e.g. a mechanical helical torsion spring, to achieve the same functional result.

The counter inertia member 28 is rotatably disposed about a shaft 29 which is mounted to base 44. The counter inertia member 28 is retained on the shaft 29 by a retaining washer (not shown). As a convenience for manual or automated assembly, the counter inertia member 28 includes limit stops 42 which limit the rotary travel of the counter inertia member 28 by contacting e.g. a die cast pin extending from the base 44. In the embodiment presented in FIGS. 7A and 7B, the counter inertia member 28 is disk-shaped like a platter and is located under the bottom surface of disk 45. Like the latch member 21, the counter inertia member 28 is configured such that it is mass balanced about its axis of rotation. Both the latch member 21 and the counter inertia member 28 can be conveniently made as injection-molded plastic parts.

The counter inertia member 28 preferably includes a spur gear segment comprising several gear teeth 40 disposed at its periphery which mesh with a spur gear segment of corresponding teeth 41 formed integrally with the latch member 21. As presented in FIG. 6, alignment with the gear teeth 40 of the counter inertia member 28. Accordingly, the gear teeth 40 and 41 are meshably engaged, enabling latch member 21 and counter inertia member 28 to each rotate in one direction in response to the other's rotation in the opposite direction. It is preferable to have a sufficient number of teeth on the counter inertia member 28 as well as the latch member 21 for the two members to remain in meshed engagement as the latch member 21 rotates through its full range of travel, from fully open (unlatched) to fully closed (latched).

It is understood from the principles of gear design that a gear ratio between two gears is defined as the ratio between the angular motion of a driven gear to the angular motion of a driver gear. It is also understood that gear ratio is proportional to a ratio of a pitch diameter of the driver gear to a pitch diameter of the driven gear. For purposes of consistency, the foregoing discussion will consider the latch member to be the driver element and the counterinertia member to be the driven element. Thus, the gear ratio between the two members 21 and 28 is defined by the ratio of the pitch diameter of the gear segment on the latch member 21 and the pitch diameter of the gear segment on the counterinertia member 28. In one preferred embodiment, the gear segment on the latch member 21 has a pitch diameter of 15.0 mm and the gear segment on the counter inertia member 28 has a pitch diameter of 27.5 mm. Therefore, as defined above, the gear ratio between the members is 15.0/27.5 or 1.000:1.833, i.e. if latch member 21 rotates through an angle $\beta$, the counterinertia member 28 will rotate through an angle $(1/1.833)*\beta$ in the opposite direction.

To understand how the present invention resists rotational shock forces, the dynamics of the actuator latching assembly will now be discussed with reference to FIG. 5A-5C. As presented in FIG. 5A, the base 44, latch member 21 and counter inertia member 28 of FIG. 3 may be conceptualized in an abstract way as base 90 and bodies 91 and 92, respectively. As modeled in FIG. 5A, each body, 91 and 92, is free to rotate with respect to body 90, but both are "geared" together so that they must counter rotate. Bodies 91 and 92, are further balanced and exhibit respective moments of inertia J1 and J2 about their respective axes of rotation. R1 and R2 represent the distances from the respective centers of rotation to the mesh point A. When the base 90 is subjected to an angular acceleration AA about the axis O, an angular acceleration of equal magnitude must be imparted to each of the bodies 91 and 92 to ensure that the bodies resist rotation with respect to the base 90.

Examining FIG. 5A, it should be understood that there may be two sources which can provide sufficient torque to generate angular acceleration to the bodies 91 and 92. First, the rotary connection between each body 91 and 92 and the base 90 may be assumed to be very low friction and occur at a very small radius such that any torque generated may thus be assumed to be negligible. Therefore, the only source for generating sufficient torque would be the gear mesh point A. As shown in FIG. 5B, F1 represents a force acting at this point. By the principles of gear design, F1 is tangent to the gear's base circle of radius R1. Force F1 acting at a moment arm of R1 imparts a torque T1 to body 91. Torque T1 must be exactly sufficient to impart angular acceleration AA to body 91 in order to keep body 91 from rotating with respect to base 90. Hence torque T1 can be represented mathematically as $$T1 = F1*R1 = J1*AA \tag{1}$$

or $$F1 = (J1*AA)/R1 \tag{2}$$

Examining FIG. 5C, a force F2 acting at gear mesh point AA can be similarly represented as $$T2 = F2*R2 = J2*AA \tag{3}$$

or $$F2=(J2*AA)/R2 \qquad (4)$$

Since F1 and F2 are equal and opposite reaction forces, we can equate their magnitudes, $$(J1*AA)/R1=(J2*AA)/R2 \qquad (5)$$

such that $$J2=(R2/R1)*J1 \qquad (6)$$

Therefore, the ratio of the respective inertias of the two bodies 91 and 92 is equivalent to the ratio of the respective radii of the two bodies. Based on principles of gear design, the ratio of the radii of two gears e.g. R2/R1, is inversely proportional to the gear ratio of those two gears. Hence applying these principles to the present invention, the ratio of inertia of the latch member 21 and the counter inertia member 28 may be represented by $$J_C=(N_C/N_L)*J_L \qquad (7)$$

where $J_C$ is the inertia of the counter inertia member 28, $J_L$ is the inertia of the latch member 21, and $N_C/N_L$ is the inverse of the gear ratio between the latch member 21 and the counterinertia member 28.

In practice, the actual configuring of the airlock actuator latch assembly 20 is an iterative process. First, the latch member 21 is designed. Once an optimum design is determined, its inertia $J_L$ is then calculated. A numerical gear ratio between the latch member and the counter inertia member is then tentatively selected, which, as described herein above, defines the necessary moment of inertia which the counter inertia member must have. A provisional design of the counter inertia member is then generated which fits within the available space, and its moment of inertia is then checked. If the moment of inertia is significantly greater than the desired value, then the initial choice of gear ratio was too low, and vice-versa. In either case, a new, more nearly correct gear ratio and, hence, inertia ratio is selected and the process is repeated. Eventually the moment of inertia of the counter inertia member will closely approach the desired value and can then be adjusted by small additions or subtractions of mass. In one preferred embodiment, the latch member has an inertia of 46.2 g-mm² and the gear ratio between the latch member 21 and the counter inertia member 28 is 1.000:1.833. Accordingly, the counter inertia member is designed to have an inertia of 1.833*46.2 or 84.7 g-mm².

During normal operation, the present invention functions much like the conventional airlock latching mechanism. FIG. 4 represents the disk drive 100 of FIG. 3 with the latch member 21 in the unlatched position as the disk rotates. In this position, airflow generated by the spinning disk impinges on air vane portion 21a. The windage torque eventually overcomes the return spring torque and causes the latch member 21 to rotate in a clockwise direction until a mechanical stop 47 contacts a sidewall of the base 44. Meanwhile under the action of meshing gears 40 and 41, the counter inertia member 28 undergoes a complementary counterclockwise rotation. In this unlatched position, the transducer actuator assembly 27 is free to rotate, enabling transducer assembly 31 to move away from the landing zone 62 and into the data zone 3 of the disk 45, as shown in FIG. 4. When the spindle motor 46 is switched off, the back EMF (electromotive force) of the motor 46 is fed to the actuator voice coil motor 49, causing transducer actuator assembly 27 to rotate counterclockwise until inner stop 50 is reached. Meanwhile, as the disk 45 decelerates, the aerodynamic force on the air vane portion 21a gradually decreases. At some point, the return spring torque becomes greater than the windage torque, causing the latch member 21 to rotate in a counterclockwise direction into the latched position, as depicted in FIG. 3.

While the meshed gear segments are preferably employed to couple the counter inertia member 28 and the latch member 21, other counter rotational coupling arrangements may be usefully employed, such as a four-bar linkage, a crossed belt drive arrangement, etc., for example.

It should also be understood that linear accelerations applied to the disk drive cannot induce a rotational movement in a balanced body. Since both the latch member and the counter inertia member are balanced about their respective axes of rotation, as discussed above, the members are also highly resistant to purely linear shocks. Thus, any linear components of a rotary shock force can be ignored.

The airlock actuator latch assembly 20 provides several advantages over the prior art actuator latching mechanisms. First, latch assembly 20 provides inertial resistance to rotary as well as linear shock forces applied to the disk drive, enabling the transducer actuator assembly to remain latched when the disk is not rotating. Second, there is no need for extraneous electronic controls because the latch assembly is based on principles of dynamics which inherently exist within the disk drive assembly. Thus, the present invention can provide a simple and cost efficient disk drive assembly.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. An airlock actuator latch assembly for restraining a transducer actuator assembly in a disk drive having at least one rotatable disk, the latch assembly comprising:

a latch member having a first inertia and a plurality of gear teeth and being pivotably mounted about a base in the disk drive, the latch member for engaging the transducer actuator assembly when the disk is not rotating, the latch member tending to release engagement with the actuator assembly when a rotational shock force is applied to the disk drive; and a counter inertia member having a plurality of gear teeth being pivotably mounted about the base and being meshably engaged with the plurality of gear teeth of the latch member, thereby being rotatably coupled to the latch member, the counter inertia member having a second inertia which inertially counteracts the first inertia of the latch member when the rotational shock force is applied to the disk drive thereby negating the tendency of the latch member to release engagement with the actuator assembly.

2. The airlock latch assembly of claim 1 wherein the counter inertia member rotates in a first direction only when the latch member rotates in a second direction, opposite relative the first direction.

3. The airlock latch assembly of claim 2 wherein the counter inertia member includes limiting means for limiting a range of rotational displacement of the counter inertia member.

4. The airlock latch assembly of claim 1 wherein a gear ratio between the latch member and the counter inertia member is approximately 1.000:1.833.

5. The airlock latch assembly of claim 4 wherein a ratio of inertia between the counter inertia member and the latch member is inversely proportional to the gear ratio.

6. The airlock latch assembly of claim 1 wherein the latch member and the counter inertia member are each mass balanced about their respective axes of rotation such that the transducer actuator assembly remains restrained when the disk drive is subjected to a linear shock force.

7. The airlock latch assembly of claim 1 wherein the latch member further comprises a latch portion for engaging the transducer actuator assembly and an integral air vane portion for being deflected by an airflow force generated by disk rotation.

8. The airlock latch assembly of claim 7 wherein the latch portion disengages from the transducer actuator assembly when the air vane portion is deflected by the airflow force.

9. The airlock latch assembly of claim 1 further comprising means for biasing the latch member into engagement against the actuator during non-rotation of the disk.

10. The airlock latch assembly of claim 1 wherein the transducer actuator assembly comprises a rotary voice coil actuator which is journalled to the base for rotation over a limited range of rotational displacement.

11. A method of manufacturing a disk drive to maintain a transducer actuator assembly at a landing zone on a surface of a data storage disk when the data storage disk is not rotating and the disk drive is subjected to a rotational shock force, the method comprising the steps of:

mounting a rotatable latch member to a base of the disk drive at a first predetermined distance from an edge of the data storage disk, the latch member having a first inertia and engaging the transducer actuator assembly;

disposing two or more gear teeth at a first predetermined pitch diameter about the latch member;

coupling the latch member with a counter inertia member rotatably mounted to the base at a second predetermined distance from the latch member, the counter inertia member having a second inertia which inertially counteracts the first inertia of the latch member when the disk drive is subjected to the rotational shock force such that the latch member remains engaged with the transducer actuator assembly and restrains the actuator assembly within the landing zone; and disposing two or more gear teeth at a second predetermined pitch diameter about the counter inertia member, for meshably engaging the latch member gear teeth, such that a ratio of the first predetermined pitch diameter to the second predetermined pitch diameter is approximately equivalent to a ratio of the first inertia to the second inertia.

12. The method of claim 11 wherein the ratio of the first inertia to the second inertia is approximately 1.000:1.833.

13. The method of claim 11 wherein the latch member includes a latch portion for engaging the transducer actuator assembly and an integral air vane portion for being deflected by an airflow force generated by disk rotation.

14. A method for resisting rotational shock forces within a hard disk drive, having a rotating disk journalled to a base, a voice coil head transducer actuator structure mounted to the base, and a rotary airlock journalled to the base and mass balanced about an axis of rotation for locking the voice coil actuator structure at a fixed position relative to the disk in absence of airflow generated by rotation of the disk, the method comprising the steps of:

providing a counterinertia body journalled about a second axis of rotation to the base and mass balanced about the second axis of rotation;

operatively coupling the counterinertia body to the rotary airlock such that a response from a rotary shock force in the rotary airlock will be counteracted by a response from the rotary shock force in the counterinertia body thereby maintaining the rotary airlock in locked engagement with the voice coil actuator structure.

15. The method of claim 14 wherein the step of operatively coupling the counterinertia body to the rotary airlock comprises the step of engaging a spur gear segment extending from the rotary airlock with a spur gear segment extending from the counterinertia body.

* * * * *